United States Patent
Ganesh et al.

(10) Patent No.: US 9,021,482 B2
(45) Date of Patent: Apr. 28, 2015

(54) REORDERING DATA RESPONSES USING ORDERED INDICIA IN A LINKED LIST

(75) Inventors: Brinda Ganesh, College Park, MD (US); Xiaowei Shen, Hopewell Junction, NY (US); Jessica Hui-Chun Tseng, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 1395 days.

(21) Appl. No.: 11/744,546

(22) Filed: May 4, 2007

(65) Prior Publication Data

US 2008/0276240 A1 Nov. 6, 2008

(51) Int. Cl.
*G06F 9/46* (2006.01)
*G06F 13/42* (2006.01)
*G06F 13/16* (2006.01)

(52) U.S. Cl.
CPC ........ *G06F 13/4239* (2013.01); *G06F 13/1626* (2013.01)

(58) Field of Classification Search
CPC combination set(s) only.
See application file for complete search history.

(56) References Cited

U.S. PATENT DOCUMENTS

| | | | |
|---|---|---|---|
| 6,286,011 B1 * | 9/2001 | Velamuri et al. | 1/1 |
| 6,345,353 B2 * | 2/2002 | Allen et al. | 712/202 |
| 6,571,332 B1 * | 5/2003 | Miranda et al. | 712/245 |
| 7,577,773 B1 * | 8/2009 | Gandhi et al. | 710/22 |
| 2002/0002691 A1 * | 1/2002 | Whetsel | 714/28 |
| 2004/0114593 A1 * | 6/2004 | Dick et al. | 370/389 |
| 2007/0047563 A1 * | 3/2007 | Shvodian | 370/412 |
| 2007/0208604 A1 * | 9/2007 | Purohit et al. | 705/9 |

FOREIGN PATENT DOCUMENTS

| | | |
|---|---|---|
| JP | H02-18639 | 1/1990 |
| JP | 2003-535380 | 11/2003 |

OTHER PUBLICATIONS

English Abstract for Publication No. JPH02-18639, Jan. 22, 1990.
English Abstract for Publication No. JP2003-535380, Nov. 25, 2003.

* cited by examiner

*Primary Examiner* — Eric C Wai
(74) *Attorney, Agent, or Firm* — F. Chau & Associates, LLC

(57) ABSTRACT

A system includes a deterministic system, and a controller electrically coupled to the deterministic system via a link, wherein the controller comprises a transaction scheduling mechanism that allows data responses from the deterministic system, corresponding to requests issued from the controller, to be returned out of order.

3 Claims, 9 Drawing Sheets

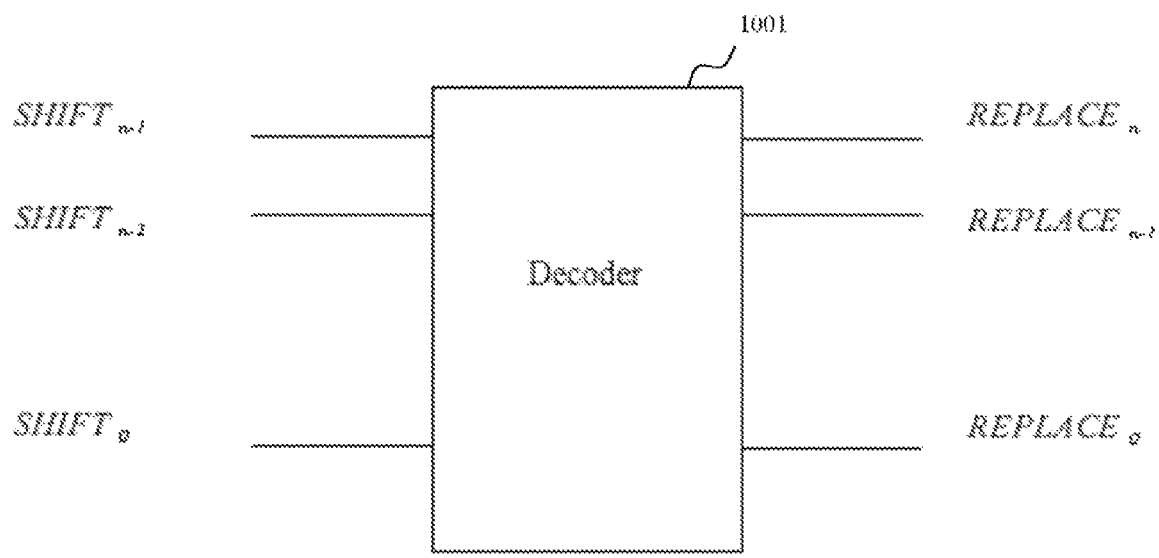
FIG 10A
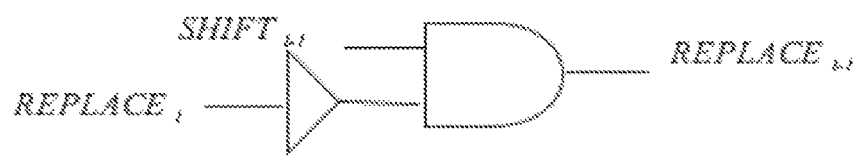
FIG 10B $REPLACE_i$ signal for $i < n$ (maximum number of counters)
FIG 10C $REPLACE_i$ signal for $i = n$ (maximum number of counters)

REORDERING DATA RESPONSES USING ORDERED INDICIA IN A LINKED LIST

BACKGROUND OF THE INVENTION

1. Technical Field

The present invention relates to memory controllers, and more particularly to the reordering of data responses.

2. Discussion of Related Art

A memory controller 101 of a deterministic memory system 102 receives data back from the memory in the same order as the transactions' issuing order (see FIG. 1). This can lower the memory bandwidth utilization and increase the read latency of transactions. Both these characteristics can be improved if the return data is allowed to return out of issuing order.

Referring to FIG. 2, the point-to-point links between the memory controller 101 and the memory modules 201 and between the memory modules are split into two uni-directional buses; one for read traffic 202 and another for write and command traffic 203. The memory controller 101 comprises of an issue queue 204 from which commands to the memory modules 201 are issued. Read requests are moved from the issue queue to a response queue 205 once the request has been sent out to the memory module. Note architectures with unified issue and response queue can also be used. The function of the response queue 205 is to associate the returning read data with the appropriate read request. Read requests 206 are associated with IDs 207, also referred to as transaction IDs, which are used by the requesting component to identify the read requests.

Due to use of the daisy chain, the distance of a memory module from a particular memory controller is a function of the distance of the memory module from the memory controller. Thus, memory transactions addressed to two different memory modules would want to start using the return data bus at two different times. There could however be some overlap in the times that they request the bus.

The FIG. 3 depicts the usage of the return data link in the system which is closest to the memory controller from the current scheduling instant, represented as $T_0$, to the last instant at which a transaction that is scheduled at $T_0$ can use the link, $W_1$. Filled red slots are used to identify periods when the link is utilized by returning read data. Free slots are marked by blank spaces. $W_0$ is the earliest that a read transaction will require this link, while $W_1$ is the latest that a transaction will require the link. Typically, $W_0$ corresponds to the time at which a read data from the first memory module in the daisy chain would start using the link and $W_1$ corresponds to the instant at which a memory request to the last memory module in the chain would complete using this link. A red line marks the completion time of the last transaction to use the link.

Current existing solutions permit the return data to return in the same order that the commands are issued in. In order to enforce this and ensure that returning data does not conflict on the link, the memory controller tracks the last usage of the return link. This information is tracked by using a single register or counter. The memory controller uses this register to determine if the return data link is available for scheduling the next memory read request. Upon scheduling a read request, this register is updated.

In-order return requires that the memory controller schedule only transactions that return read data after the completion of the last transaction. As seen in FIG. 3, this approach results in the scheduler having to forgo many opportunities prior to the completion of last read data return.

If the memory controller permitted read data out-of-order (i.e. in a different order from that in which the requests were sent out), the memory controller could use the idle gaps in the scheduling window prior to the start of the last read transaction data burst. This would require that the memory controller track all the busy times which fall within the scheduling window, $W_0$ and $W_1$.

In such a system the memory controller maintains a FIFO response queue, i.e., a queue with read transactions that have already been issued to the memory modules and are in the process of returning data. The queue can be implemented in several different ways. One such implementation is shown in FIG. 4. As seen in FIG. 4 all read transactions that are issued are enqueued at the tail and all returning read data is associated with the head entry.

In-order return of read data lowers the bandwidth utilization and increases the latency in a memory system that uses point-to-point interconnect.

To permit memory data to return in a different order from which it is issued, a mechanism should be provided to allow the memory controller to be able to associate the return data with the appropriate read data. One such approach would be to insert tags with each return data to identify the ordering. This mechanism would require the memory controller to generate and monitor tags. The protocol would nave to be modified to incorporate tags. The response queue would have to be modified to allow tag matching. The response queue would have to be modified to permit data to return. FIG. 5 depicts a possible implementation for such an approach. Read data is associated with a tag which is used to perform a look up in the response queue. The associated transaction information is read out when there is a tag match.

The disadvantage of using read data tags is that the memory controller would require additional logic to generate track and maintain the tags. Further, tags would have to be associated with all read data and this would lower the available bandwidth to transmit read data.

Therefore, a need exists for a memory controller for reordering of data responses.

SUMMARY OF THE INVENTION

According to an embodiment of the present disclosure, a system for implementing out-of-order data responses includes a deterministic system, and a controller electrically coupled to the deterministic system via a link, wherein the controller comprises a transaction scheduling mechanism that allows data responses from the deterministic system, corresponding to requests issued from the controller, to be returned out-of-order.

According to an embodiment of the present disclosure, a system that allows data responses of requests on a deterministic system to be returned out-of-order includes a self-reordering queue stored in a memory device readable by a processor, wherein the self-reordering queue matches a data response with a corresponding data request of the processor without using a transaction tag.

According to an embodiment of the present disclosure, a computer readable medium is provided embodying instructions executable by a processor to perform a method for increasing data channel utilization. The method includes assigning counters to a last n scheduled data transactions on a link between a controller and a deterministic system, determining a busy duration associated with each data transaction, determining an unused duration between scheduled data transactions, and scheduling a next data transaction in the unused duration.

According to an embodiment of the present disclosure, a system for implementing out-of-order data responses includes a deterministic system, a controller electrically coupled to the deterministic system via a link, wherein the controller comprises a transaction scheduling mechanism that allows data responses from the deterministic system, corresponding to requests issued from the controller, to be returned out-of-order, and a plurality of self-reordering queues stored hierarchically in a memory device and electrically coupled to the controller, wherein responses to data requests are stored in one of the plurality of self-reordering queues according to a tag bit.

BRIEF DESCRIPTION OF THE DRAWINGS

Preferred embodiments of the present disclosure will be described below in more detail, with reference to the accompanying drawings:

FIGS. 10A-C depict logic for generating a replace signal according to an embodiment of the present disclosure;

DETAILED DESCRIPTION OF PREFERRED EMBODIMENTS

Figure 1:
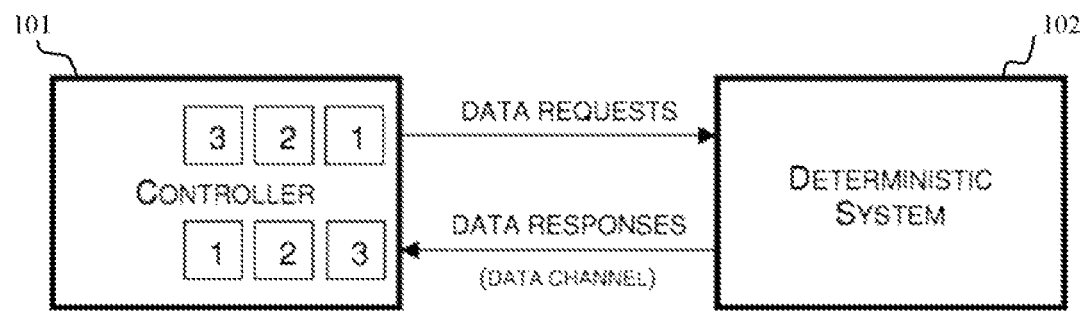
FIG. 1 illustrates point-to-point links between a memory controller and a deterministic system according to an embodiment of the present disclosure.
Figure 2:
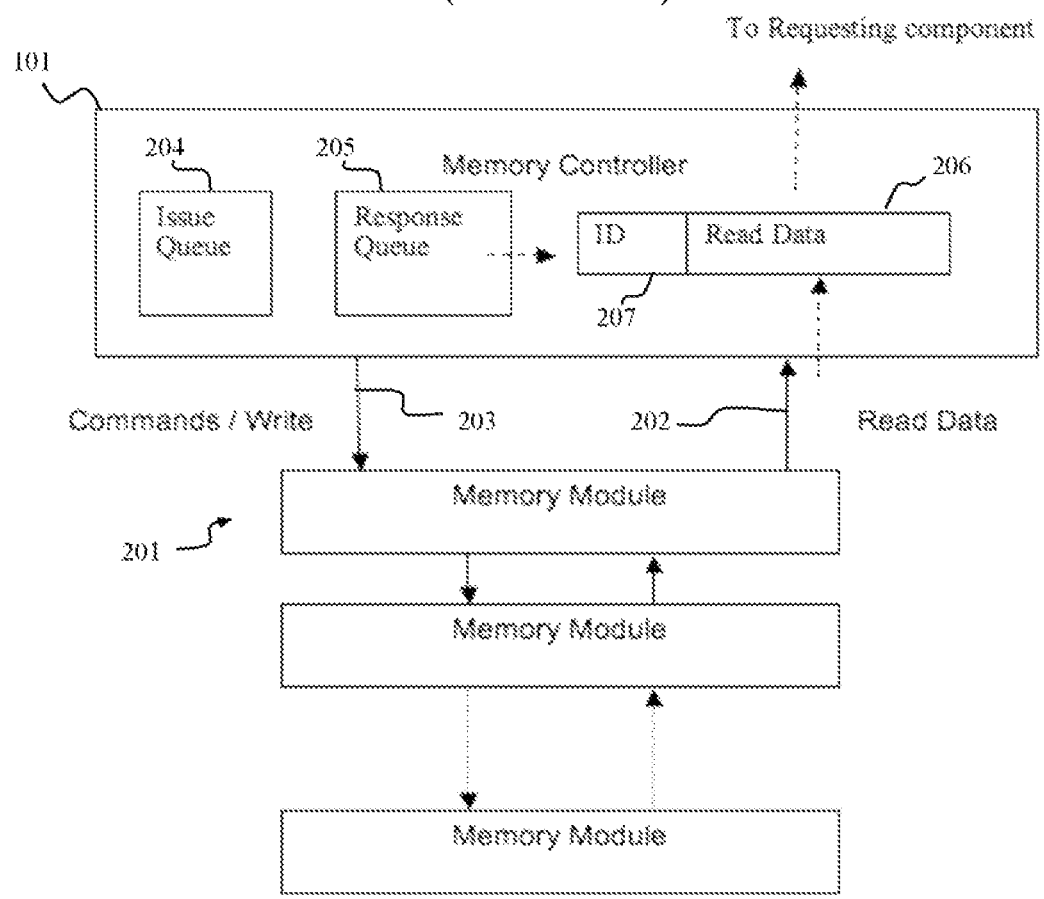
FIG. 2 shows a point-to-point memory architecture.
Figure 3:
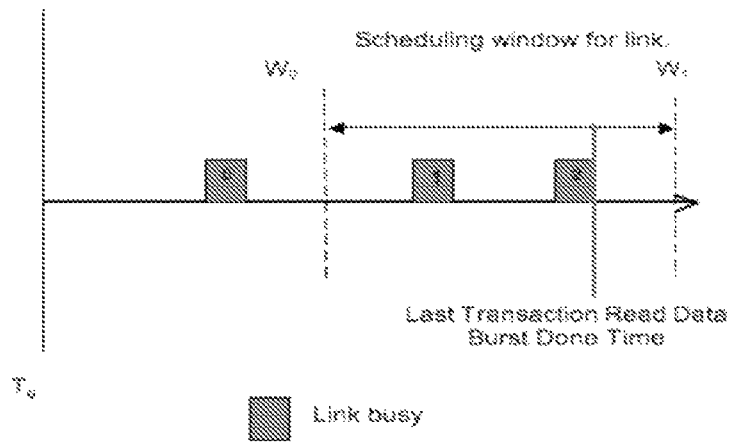
FIG. 3 depicts usage of a return data link over time.
Figure 4:
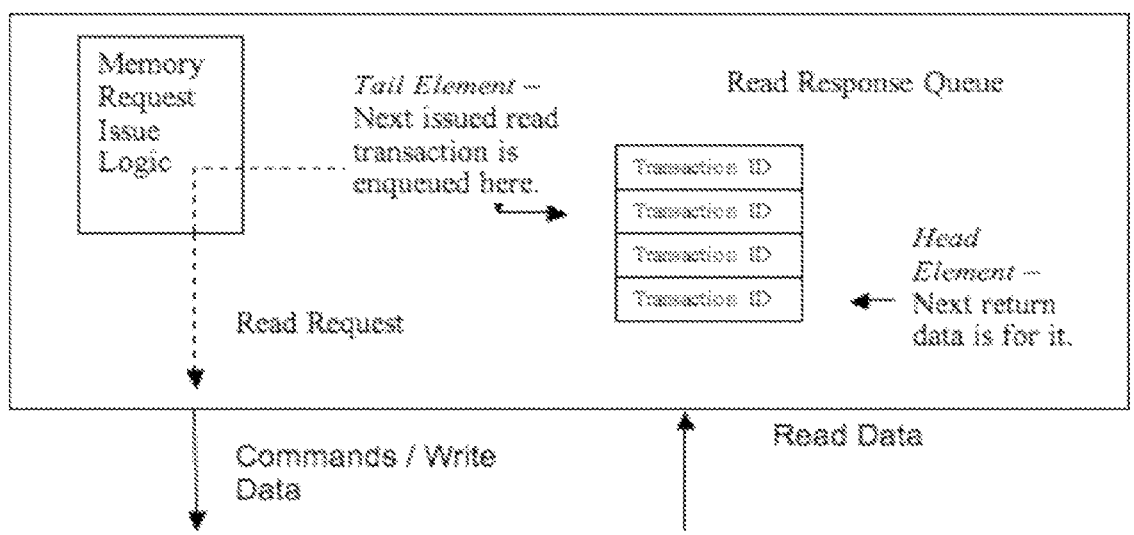
FIG. 4 depicts an architecture of a response queue in a memory system with in-order return of read data.
Figure 5:
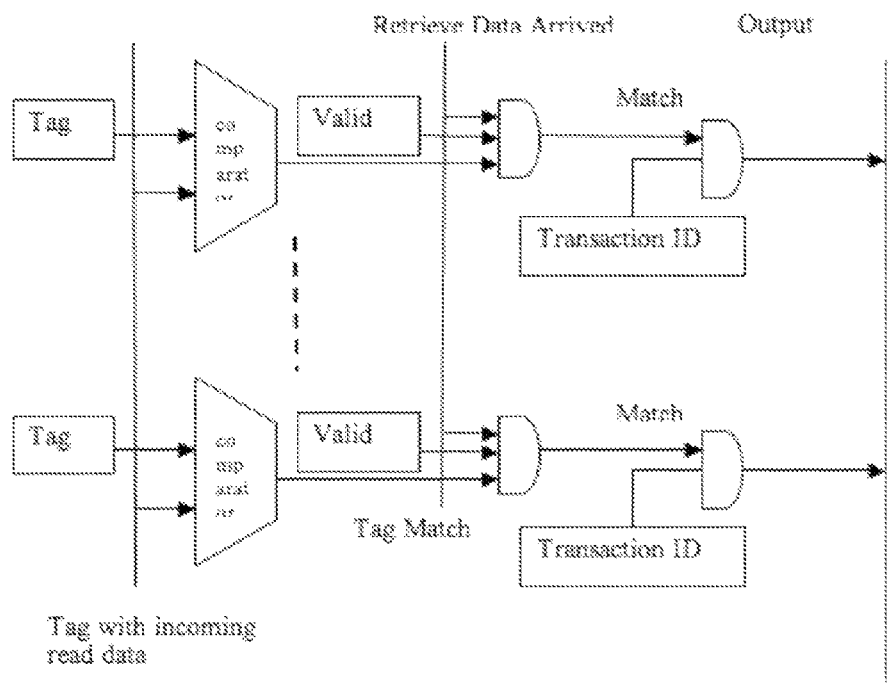
FIG. 5 depicts an architecture of a response queue in a memory system where return data returns out-of-order.
Figure 6A:
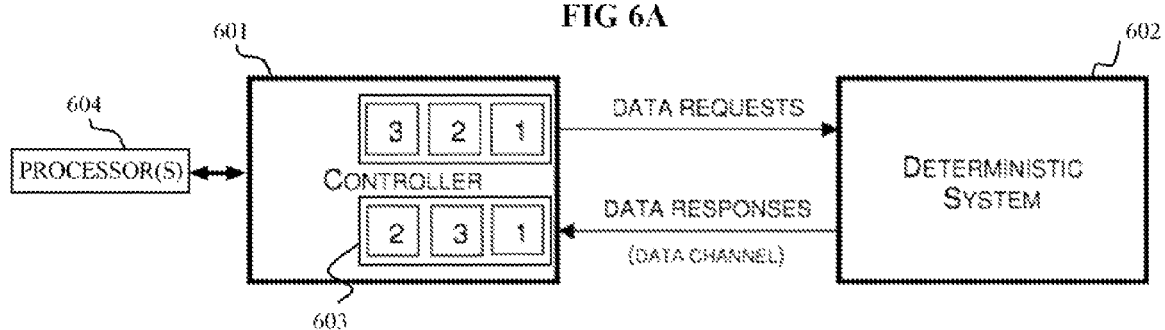
FIG. 6A illustrates point-to-point links between a memory controller and a deterministic system according to an embodiment of the present disclosure.

According to an embodiment of the present disclosure, data channel utilization is monitored and data responses of a deterministic system 602 are reordered by a controller 601 to increase data channel utilization without attaching transaction tags (see FIG. 6A). The deterministic system 602 may be, for example, a memory, an encryption unit that returns encrypted data, an accelerator (e.g., an XML accelerator) or an off-load engine (e.g., a JAVA off-load engine) that performs functions and returns results, etc., wherein the latency of each channel and processing unit can be determined.

A mechanism of the controller 601, e.g., implemented in hardware and/or software, monitors data channel utilization opportunities. For example, the controller 601 may implement counters for monitoring the data channel utilization opportunities.

A self-reordering queue 603 matches a data response with a corresponding data request without using any transaction tag.

The self-reordering queues may be used in a system with limited tag size to increase a supporting capability.

Embodiments of the present disclosure increase data channel utilization without changes to protocols or the hardware of the deterministic system. Extensions are available for systems with limited, tag size (for example, hypertransport).

Embodiments of the present disclosure include mechanisms and techniques for allowing a memory controller 601 to track the return order of read data such that there are no changes to existing memory protocols that do not use tags or use limited size tags. The memory controller 601 reorders the response queue 603 so that it matches the order in which read data is being returned. The controller 601 is connected to one or more processors 604. While the controller 601 is depicted as being separate from the processor 604, the controller 601 may be implemented on the processor 604, e.g., in a system on chip configuration.

A mechanism according to an embodiment of the present disclosure allows the memory controller 601 to track return data that returns in non-issue order without transmitting tags with the returning read data. The mechanism can also support non-issue order data return in memory systems which transmit tags with read data, but have a limited number of tag bits. The memory controller 601 can track the use of the return data channel.

Further, the mechanism increases the bandwidth utilization and reduces the read latency in the memory sub-system by allowing transactions to return in a different order from their issue order.

This mechanism eliminates the need to use tags on the return channel to keep track of return data thereby reducing the minimizing the impact on data and command bandwidth and channel power consumption.

Referring now to an exemplary implementation, the ability to track the use of the return data channel such that it can be used to and after scheduling a read request to reorder the response queue when a memory read request is issued is facilitated through the ability to track usage of the return data link and the ability to identify the order in which the data is being returned.

To maintain the order in the response queue it needs to perform operations including retrieve or return and reorder or insert. For retrieve or return, the transaction information is retrieved and the returning order is updated appropriately when a data response arrives. For reorder or insert, the response queue allows the transaction return order to be updated when a read request is sent to the memory modules. The read request that is issued should also be placed in the response queue and associated with the appropriated returning order.

Figure 6B:
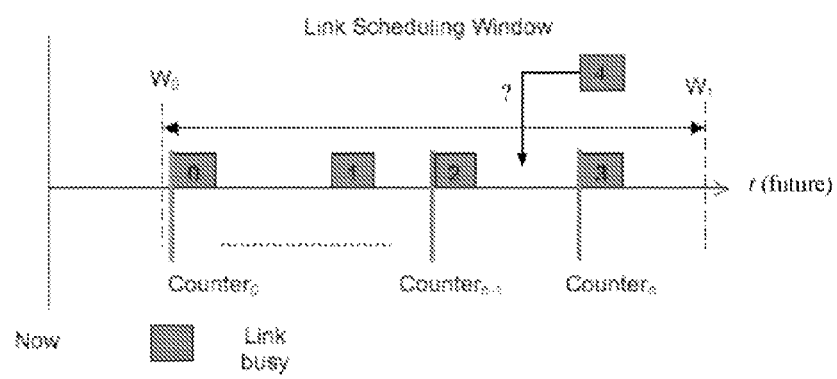
FIG. 6B depicts a counter mechanism to keep track of link utilization counters according to an embodiment of the present disclosure.

The mechanism described here increases the window that the scheduler may schedule a read transaction to return data in. This scheme uses n counters to keep track of the start of the last n busy durations of the link, wherein n is a natural number. FIG. 6B illustrates the end of busy durations tracked by each counter. The counters are sorted to track the last n responses scheduled to use the link, wherein $Counter_0$ keeps track of an earlier transaction than $Counter_n$, which keeps track of the last transaction scheduled to use the link. According to an embodiment of the present disclosure, with knowledge of the schedules of the last n responses, a decision can be made about scheduling a new transaction, e.g., response 4, between two already scheduled transactions, e.g., responses 2 and 3 (see FIG. 6B).

When the memory controller 601 makes a scheduling decision, for example, inserting response 4 between responses 2 and 3 in FIG. 6B, it ensures that the transaction does not return data so that it overlaps with any previously scheduled transaction's read burst.

The transaction is not schedulable if for any $Counter_i$, which is greater than zero and the following condition is satisfied:

$Counter_i > L_{START}$ and $Counter_i < L_{END}$ Or $(Counter_i + t_{ReadData}) > L_{START}$ stars and $(Counter_i + t_{ReadData}) < L_{END}$ Given that $L_{START}$ is the earliest that the transaction requests the link, $L_{END}$ is the latest when it requests the link, and $t_{ReadData}$ is the duration the read data takes to be transmitted back.

Since the busy durations prior to that captured by $Counter_0$ is not known, the following condition also has to be guaranteed, $Counter_0 < L_{start}$.

After making a scheduling decision, the link done time is placed in the correct counter and the remaining counters are updated accordingly.

Figure 7:
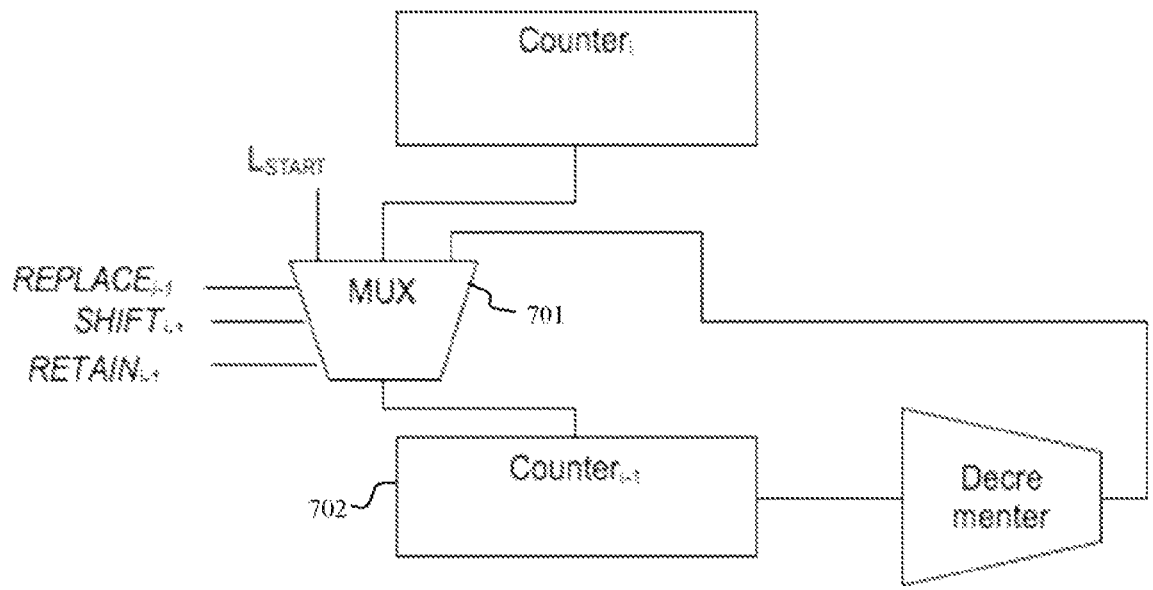
FIG. 7 depicts a mechanism for updating counter values according to an embodiment of the present disclosure.

FIG. 7 shows the memory controller 601 for updating the counters following a scheduling decision. Inputs to a multiplexer (MUX) 701 are used to determine which value the $Counter_{i-1}$ 702 is to be updated with.

$Counter_{i-1} = Counter_i$, when $SHIFT_{i-1}$ is set to 1 ($Counter_i < L_{start}$).

$Counter_{i-1} = L_{start}$, when $REPLACE_{n-1}$ is set to 1.

$Counter_{i-1} = Counter_i - 1$, when $RETAIN_{i-1}$ is set to 1.

Figure 8:
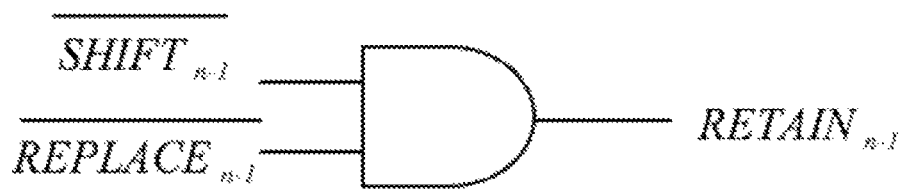
FIG. 8 depicts a logic to generate a retain signal according to an embodiment of the present disclosure.

FIGS. 8, 9 and 10A-C illustrate how the MUX control signals are generated:

$RETAIN_{i-1} = !REPLACE_{i-1}!SHIFT_{i-1}$ (see FIG. 8 depicting how to generate a RETAIN signal using SHIFT and REPLACE signals)

Figure 9:
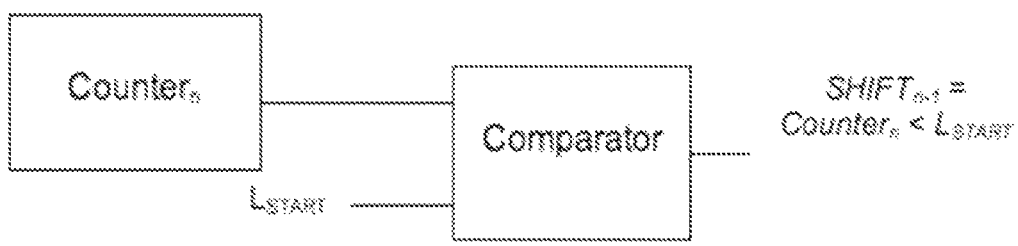
FIG. 9 depicts a logic for generating a shift signal according to an embodiment of the present disclosure.

$SHIFT_{i-1} = COUNTER_i < L_{START}$ (see FIG. 9 depicting the use of logic for determining if $Counter_{n-1}$ should be updated with a value of $Counter_n$)

$REPLACE_i = 1$ if i=n, $REPLACE_n = COUNTER_n < L_{START} = SHIFT_{n-1}$
if i<n, $REPLACE_i = COUNTER_i < L_{START}$ and $REPLACE_{i+1} = 0$ (see FIG. 10A-C depicting a decoder 1001 and logic for generate REPLACE signals)

The response queue 603 permits re-ordering of data returns to be viewed as a linked list where the first element in the list or the head of the list holds the information for the transaction that is to return. The main operations needed to access the queue and update it upon the issue of a memory request include retrieving and reordering.

Retrieving would imply returning the head element and moving the head pointer to the next element in the queue. The reorder or insert operation would include traversing the queue and placing the element in the appropriate position.

Each queue entry holds the returning order of the entry, the identification (ID) of the transaction it refers to and a valid bit. The valid bit indicates the availability of each entry The returning order indicates when the transaction completes. Entries are addressed by the returning order and this order is updated dynamically. The dynamic returning order can be maintained in the form of self-increment/self-decrement counters, shift registers, etc. The transaction that is to complete first or at the head of the returning order is associated with the returning order zero. Each entry can be read when it reaches the head of returning order and can be read only once.

The main operations needed to access the queue and update it upon the issue of a memory request include retrieving and reordering.

Figure 11:
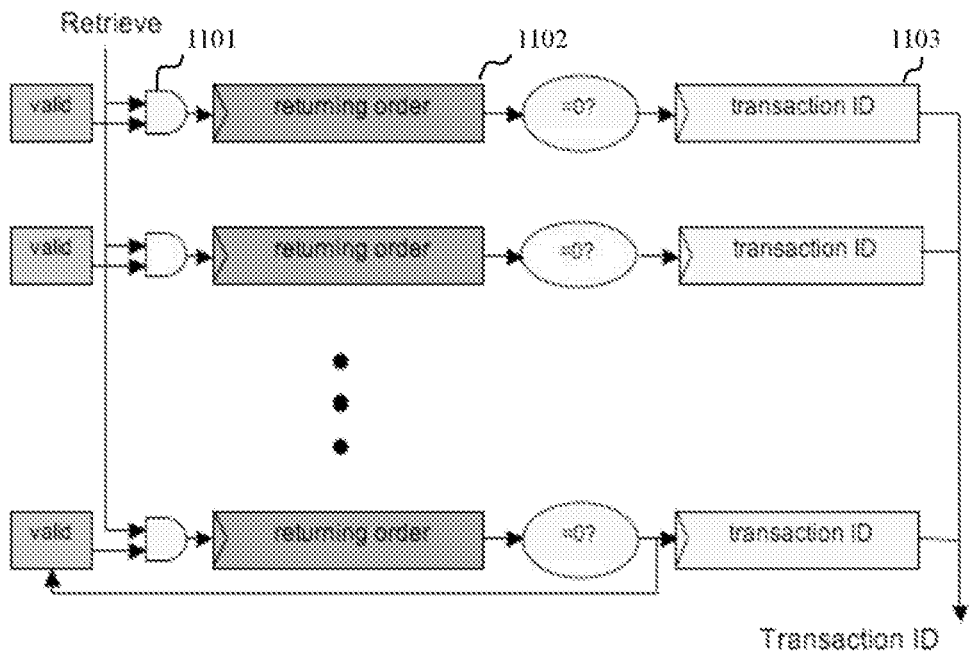
FIG. 11 depicts retrieve logic hardware according to an embodiment of the present disclosure.
Figure 12:
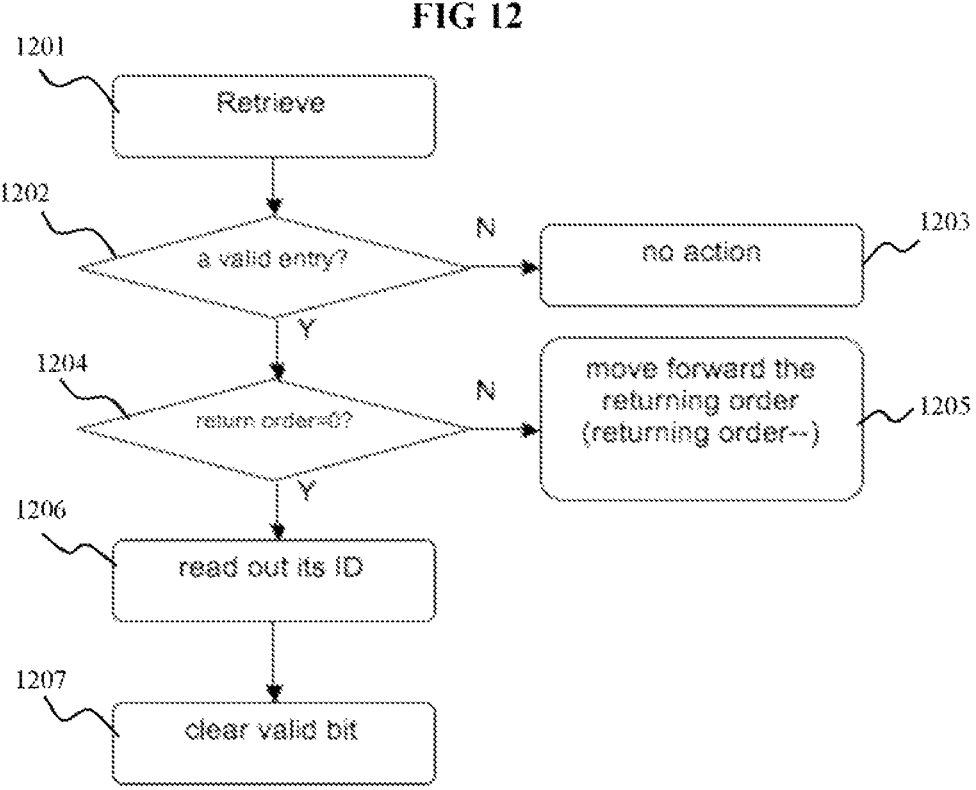
FIG. 12 is a flow chart of a retrieve operation according to an embodiment of the present disclosure.

FIGS. 11 and 12 show how the retrieve operation can be implemented in hardware and logic, respectively. Retrieve is performed when read data arrives at the memory controller. The memory controller needs to retrieve the transaction ID associated with the read data and ship this back to the memory controller with the read data. The memory controller uses a logic unit 1101, such as an AND, to validate a retrieve entry and determine inputs to a returning order queue 1102 and identify a transaction ID queue 1103.

The retrieve signal is asserted and this initiates the comparison operation to determine which transaction ID has returning order zero. FIG. 12 shows the retrieve operation 1201, including validating an entry 1202, wherein an invalid entry results in no action 1203. The operation 1201 includes determining whether a return order is equal to 0 1204, otherwise move forward the returning order 1205. The operation 1201 includes reading out an ID 1206 and clearing a value bit 1207. Upon a hit in the queue, the transaction ID is read out and all the returning orders are updated.

Figure 13:
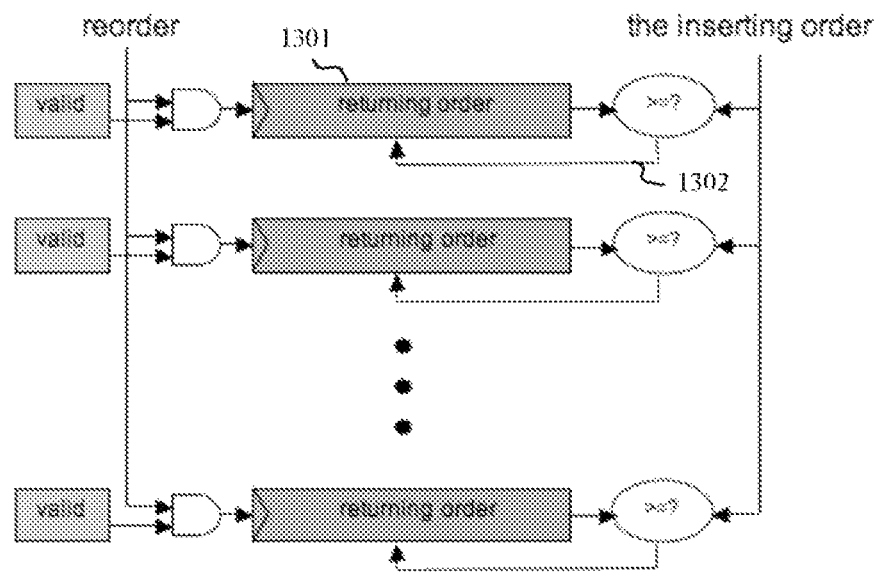
FIG. 13 depicts a hardware implementation of an update operation according to an embodiment of the present disclosure.
Figure 14:
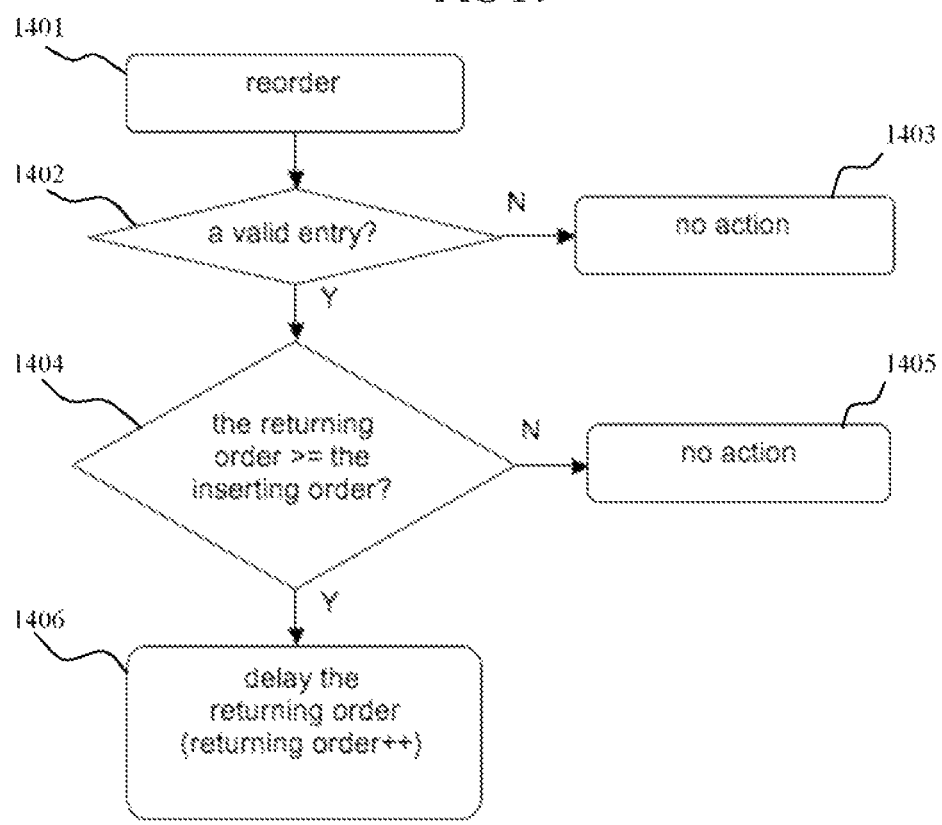
FIG. 14 is a flow chart of a reorder operation according to an embodiment of the present disclosure.

FIGS. 13 and 14 show a hardware implementation of the update logic and logic thereof, respectively.

Reorder operations are performed when a read request is issued from the memory controller to the memory. The processor-issued transaction ID needs to be stored in the self-reordering content-addressable memory with the appropriate entry ID. Further the returning order of the other read requests would have to be updated.

The reorder hardware determines the returning order 1301 of the issued request, updating the returning order of existing outstanding requests 1302 and writing its transaction ID and the corresponding returning orders to an available entry.

Referring to FIG. 14, a reorder method includes receiving a reorder request 1401, validating the request 1402, wherein no action is taken for an invalid request 1403. The method includes delaying the returning order 1406 if the returning order is greater than or equal to an inserting order 1404, otherwise not action is taken 1405.

Figure 15A:
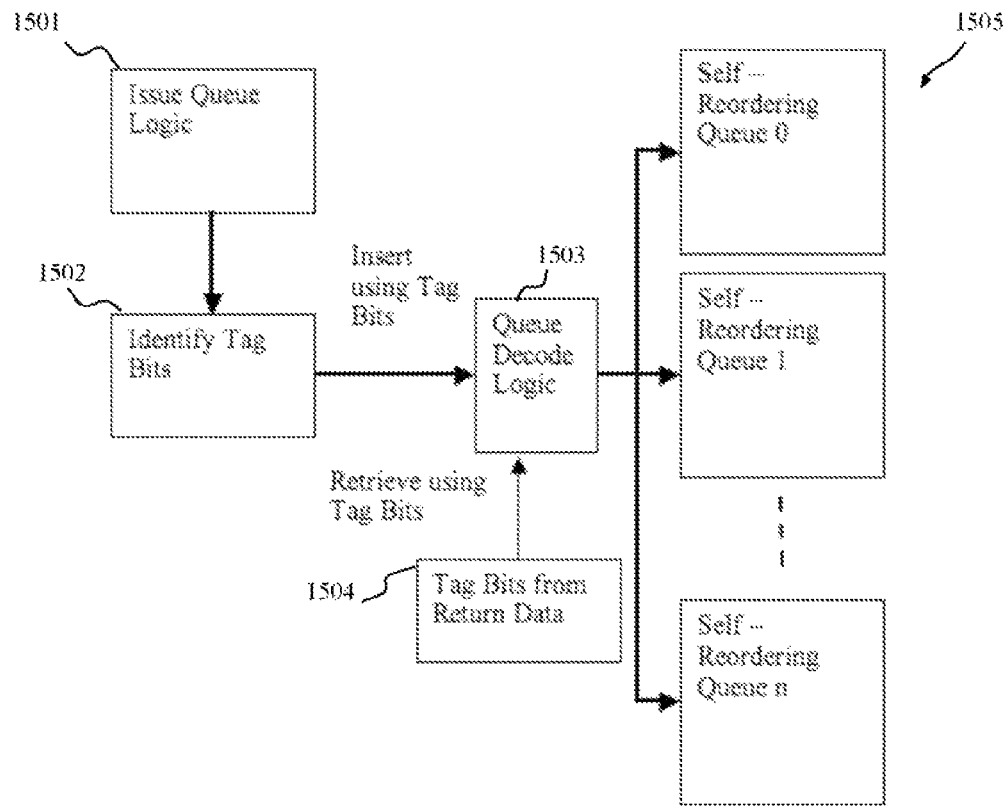
FIG. 15A is a flow chart of a multi-level self-reordering queue according to an embodiment of the present disclosure.

The queue re-ordering mechanism can be extended to systems which have limited number of tag-bits available. In such a system the response queue can be organized into a hierarchy of self-reordering queues as shown in FIG. 15A. When issuing the request to the memory sub-system 1501 the memory controller places the request into the self-reordering queue 1505 as identified 1503 by the tag bits 1502. The memory modules return the data with the tag bits 1504 that are then used to look up the response queue for the data 1505. Mote that each self-reordering queue 1505 is identical to those described above.

For the system of FIG. 15A, the number of tag bits is determined by log 2 (the number of self-reordering queues), wherein the number issue queues is equal to $2^{(number\ of\ tag\ bits)}$. The number of tag bits that are used to index the self-reordering queues is less than or equal to the tag size of the deterministic system. Also, the tag bits used to index the self-reordering queues are a subset or identical to the tag bits of the deterministic system. Extensions may be implemented for systems with limited tag size because it supports a hieratical identification scheme by using the self-reordering queues to track the expected data response order and to match the data response with the corresponding request in the self-reordering queues.

Figure 15B:
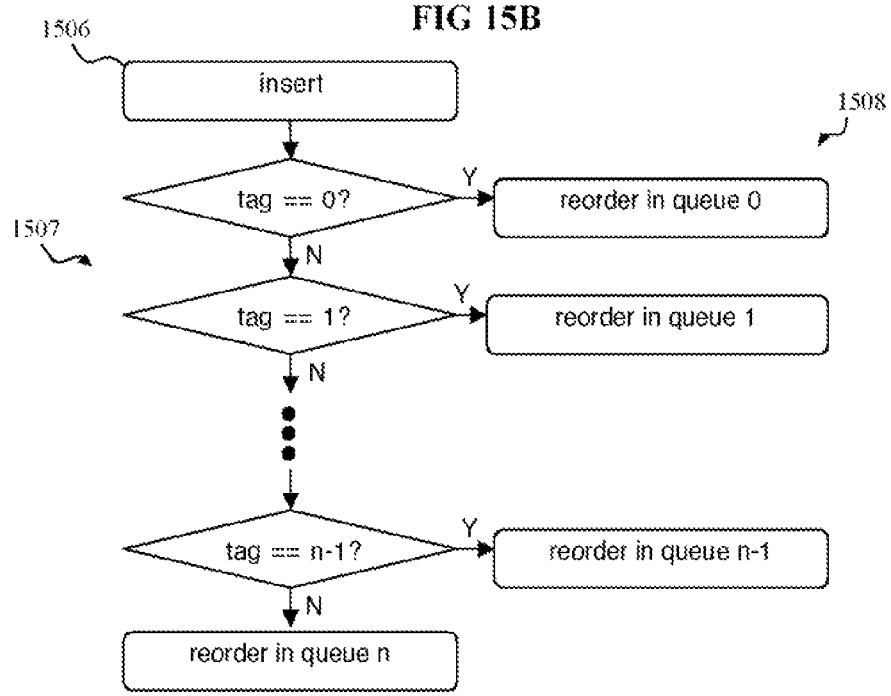
FIG. 15B is a flow chart of an insert operation of the queue decode logic to n number of self-reordering queues.
Figure 15C:
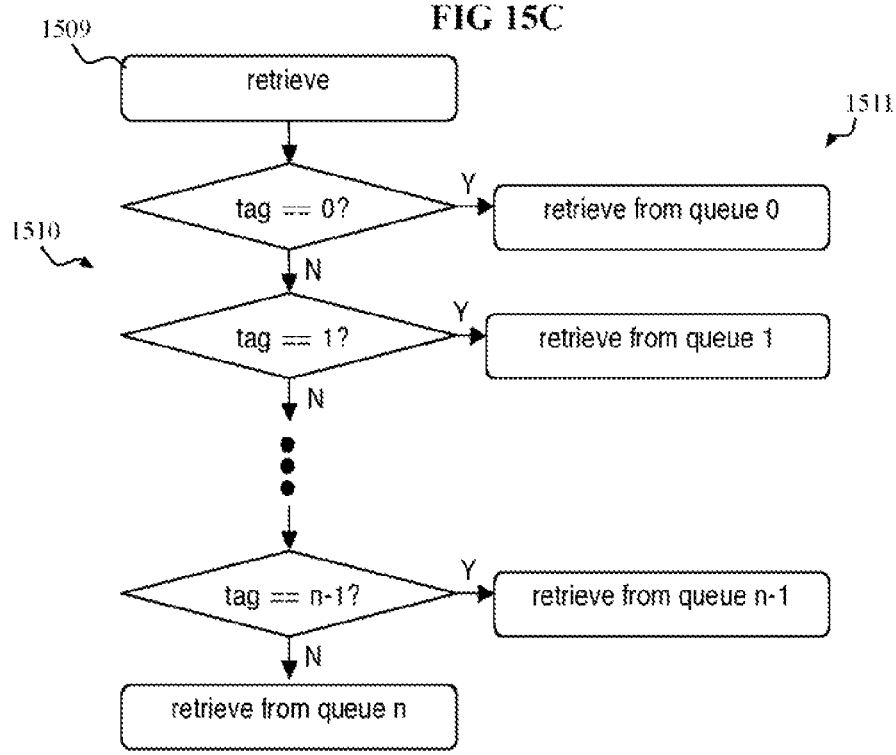
FIG. 15C is a flow chart of a retrieve operation of the queue decode logic from n number of self-reordering queues.

The queue decode logic 1503 performs insertion (FIG. 15B) and retrieval (FIG. 15C) of data from the plurality of self-reordering queues 1505. More particularly, the insertion 1506, includes determining a value of a tag bit in the return data 1507 and upon determining the value, reordering the queue associated with the tag bit 1508. The retrieval 1509 includes determining a value of a tag bit in a data request 1510 and retrieving data from the queue based on the value of the tag bit 1511.

It is to be understood that the present invention may foe implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 16:
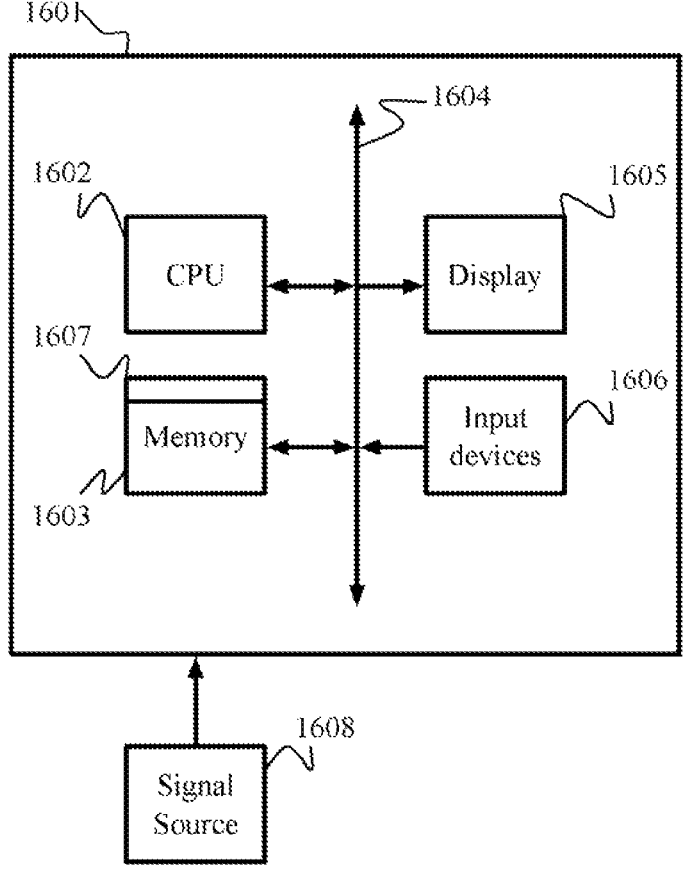
FIG. 16 is a diagram of a computer system for implementing reordering responses in a memory system according to an embodiment of the present disclosure.

Referring to FIG. 16, according to an embodiment of the present invention, a computer system 1601 for reordering of data responses can comprise, inter alia, a central processing unit (CPU) 1602, a memory 1603 and an input/output (I/O) interface 1604. The computer system 1601 is generally coupled through the I/O interface 1604 to a display 1605 and various input devices 1606 such as a mouse and keyboard. The support circuits can include circuits such as cache, power supplies, clock circuits, and a communications bus. The memory 1603 can include random access memory (RAM), read only memory (ROM), disk drive, tape drive, or a combination thereof. The present invention can be implemented as a routine 1607 that is stored in memory 1603 and executed by the CPU 1602 to process the signal from the signal source 1608. As such, the computer system 1601 is a general-purpose computer system that becomes a specific-purpose computer system when executing the routine 1607 of the present invention.

The computer platform 1601 also includes an operating system and micro instruction code. The various processes and functions described herein may either be part of the micro instruction code, or part of the application program (or a combination thereof) which is executed via the operating system. In addition, various other peripheral devices may be connected to the computer platform such as an additional data storage device and a printing device.

It is to be further understood that, because some of the constituent system components and methods depicted in the accompanying figures may be implemented in software, the actual connections between the system components (or the processes) may differ depending upon the manner in which the present invention is programmed. Given the teachings of the present invention provided herein, one of ordinary skill in the related art will be able to contemplate these and similar implementations or configurations of the present invention.

Having described embodiments for a system and method for reordering of data responses, it is noted that modifications and variations can be made by persons skilled in the art in light of the above teachings. It is therefore to be understood that changes may be made in the particular embodiments of the invention disclosed which are within the scope and spirit of the disclosure.

What is claimed is:

1. A system configured to process a plurality of data responses returned out-of-order with respect to an order of corresponding data requests, comprising:
   a controller configured to schedule the data requests on a deterministic system and to receive the plurality of data responses out-of-order from the deterministic system on a return data channel, wherein the controller knows, for each data request, a time at which a corresponding data response is to be returned from the deterministic system; and
   a self-reordering queue readable by a processor, the self-reordering queue storing an indicia of each of the plurality of data responses in a link list therein, the indicia being ordered, within the link list in accordance with a known returning order for the data responses, the known returning order being known by the controller based on the known time at which the data responses are to be returned from the deterministic system,
   wherein as the plurality of data responses are returned from the deterministic system, each data response thereof is inserted into the link list in a location of its corresponding indicia, which is accomplished without using a transaction tag as the order of the indicia within the link list is identical to the known order returning order for the data responses, and
   wherein the controller is configured to track a usage of the return data channel by the plurality of data responses and reorder the plurality of data responses or the indicia thereof in the self-reordering queue to match the known returning order of the corresponding data requests.

2. The system of claim 1, wherein the controller updates a returning order of the plurality of data responses according to a known length of a busy duration on the return data channel corresponding to the plurality of data responses in response to the data requests.

3. The system of claim 1, further comprising logic bit for validating the data requests.

* * * * *